United States Patent
Manser et al.

(10) Patent No.: US 11,133,654 B2
(45) Date of Patent: Sep. 28, 2021

(54) STRIPPING TOOL

(71) Applicant: HUBER+SUHNER AG, Herisau (CH)

(72) Inventors: Franz Manser, Herisau (CH); Pascal Henzmann, Beinwil am See (CH); Thomas Siegrist, Küsnacht (CH)

(73) Assignee: HUBER+SUHNER AG, Herisau (CN)

( * ) Notice: Subject to any disclaimer, the term of this patent is extended or adjusted under 35 U.S.C. 154(b) by 0 days.

(21) Appl. No.: 16/870,497

(22) Filed: May 8, 2020

(65) Prior Publication Data

US 2020/0313406 A1 Oct. 1, 2020

Related U.S. Application Data

(62) Division of application No. 15/572,423, filed as application No. PCT/EP2016/059285 on Apr. 26, 2016, now abandoned.

(30) Foreign Application Priority Data

May 11, 2015 (CH) .................................... 00641/15

(51) Int. Cl.
*H02G 1/12* (2006.01)

(52) U.S. Cl.
CPC ......... *H02G 1/1265* (2013.01); *H02G 1/1224* (2013.01)

(58) Field of Classification Search
CPC .. H02G 1/1204; H02G 1/1221; H02G 1/1224; H02G 1/1265; H02G 1/005; H01R 43/0421; Y10T 29/514
USPC .......... 30/90.1, 90.2, 90.3, 91.2; 81/9.4–9.44
See application file for complete search history.

(56) References Cited

U.S. PATENT DOCUMENTS

| 2,401,149 | A | * | 5/1946  | Gordon ........................ 81/9.51 |
| 3,161,088 | A | * | 12/1964 | Tolman ................ H02G 1/1224 81/9.44 |
| 3,387,514 | A |   | 6/1968  | Carpenter |
| 3,892,145 | A |   | 7/1975  | Richie |
| 3,893,491 | A |   | 7/1975  | Jackson, Jr. |
| 4,403,415 | A |   | 9/1983  | Kufrin |
| 4,422,238 | A |   | 12/1983 | Kloster |
| 4,478,110 | A |   | 10/1984 | Undin |
| 4,616,533 | A |   | 10/1986 | Wiener |

(Continued)

FOREIGN PATENT DOCUMENTS

| EP | 0140397   | A2 | 5/1985  |
| EP | 0397319   | A1 | 11/1990 |
| WO | 02/073763 | A1 | 9/2002  |

OTHER PUBLICATIONS

International Search Report of PCT/EP2016/059285 dated Jul. 27, 2016.

*Primary Examiner* — Evan H MacFarlane
(74) *Attorney, Agent, or Firm* — Amster, Rothstein & Ebenstein LLP

(57) ABSTRACT

A stripping tool for a cable includes a cutting unit with at least one blade, a cable seat, and a kinematic structure. The kinematic structure is operatively coupled with the cutting unit to move the at least one blade radially with respect to, and rotationally around, a tool axis and the cable seat. A method for stripping a cable includes moving a plurality of blades of a cutting unit with respect to each other radially to and rotationally around a tool axis. The method includes controlling and coordinating the movement of the blades via a kinematic structure.

19 Claims, 7 Drawing Sheets

(56) References Cited

U.S. PATENT DOCUMENTS

| | | | |
|---|---|---|---|
| 4,730,391 A * | 3/1988 | Wood | H02G 1/1224 30/90.1 |
| 4,805,302 A * | 2/1989 | Steiner | H02G 1/1224 30/90.1 |
| 4,979,299 A | 12/1990 | Bieganski | |
| 5,182,859 A | 2/1993 | Yoshimori | |
| 6,138,362 A | 10/2000 | Yoshimori | |
| 6,779,273 B1 | 8/2004 | Clifton | |
| 9,929,548 B2 | 3/2018 | Troy | |
| 2002/0108254 A1 | 8/2002 | Losinger | |
| 2003/0110635 A1 | 6/2003 | Holland | |
| 2004/0148780 A1 | 8/2004 | Buchmann | |
| 2005/0072003 A1 | 4/2005 | Morrow | |
| 2012/0192414 A1 | 8/2012 | Montena | |
| 2016/0006225 A1 * | 1/2016 | Watkins | H02G 1/1224 30/91.2 |

* cited by examiner

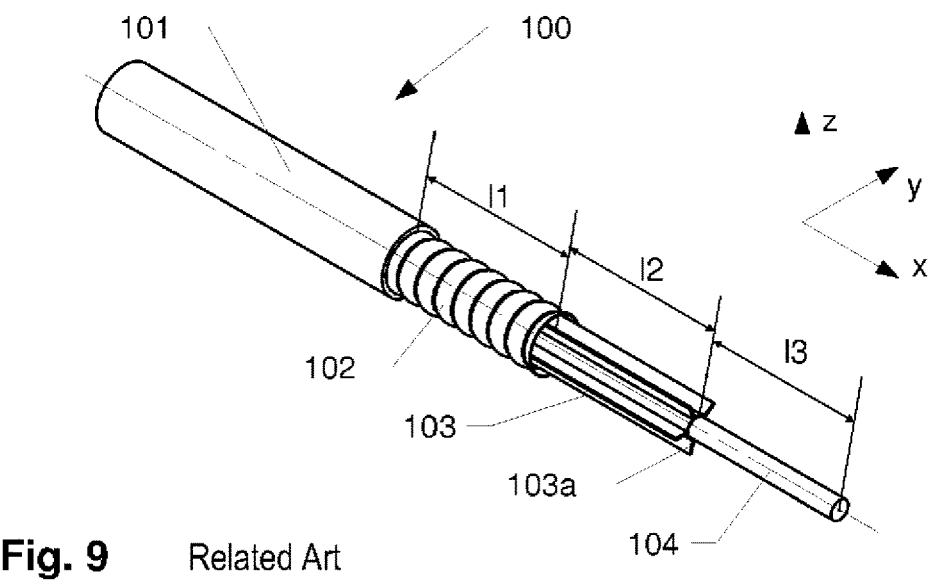
Fig. 9    Related Art
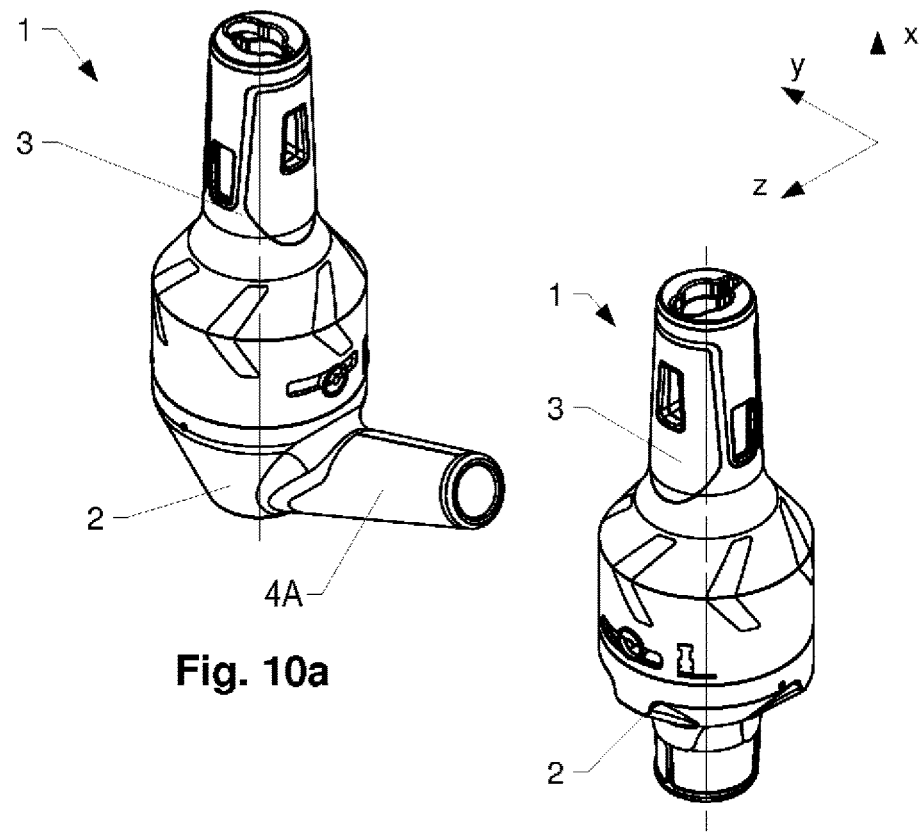
Fig. 10a
Fig. 10b

STRIPPING TOOL

CROSS-REFERENCE TO RELATED APPLICATIONS

This application is a divisional application of U.S. patent application Ser. No. 15/572,423, filed on Nov. 7, 2017, which is a U.S. national stage entry under 35 U.S.C. § 371 of PCT International Application No. PCT/EP2016/059285, filed on Apr. 26, 2016, which claims priority to Swiss Application No. 00641/15, filed on May 11, 2015, the contents of all of which are incorporated herein by reference in their entirety.

TECHNICAL FIELD

The present invention is related to the technical field of stripping tools as used for stripping to cables, for example HF (high frequency) cables or corrugated HF (high frequency) cables or generally coaxial cables. The invention is further related to methods for stripping cables and to stripped cables.

BACKGROUND AND STATE OF THE ART

In the installation of cables the task generally occurs of stripping an end section of the cable in order to electrically and mechanically connect it with corresponding clams, plug-in-connectors, sockets, etc. In the context of the present document, the term "stripping" refers to the defined removal of one or more layers of the cable in an end section of the cable. If the cable comprises a number of layers, at it is the case, e. g. for coaxial cables, the stripping typically involves the removal of several typically coaxial layers, in particular outer layers, on typically different stripping lengths.

Particularly stripping of coaxial cables with a number of layers comparatively complex, since each layer must be removed on a defined length and without cutting into or generally harming further layers. In the following, stripping is illustrated in more detail for the particularly complex examples of a corrugated HF cable.

FIG. 9 shows a stripped end section a typical corrugated cable in the perspective view. The corrugated cable 100 comprises three layers, namely a sheath 101, an outer conductor 102, a dielectric 103, and an inner conductor 104 in a coaxial arrangement, with both the outer conductor 102 and the inner conductor 104 are typically made from copper and have good conductivity and particularly high-frequency properties. Both the sheath 101 and the outer conductor 102 do not have a constant diameter along the length of the corrugated cable 100, but are corrugated, with the diameter accordingly varying along the length of the cable in a periodic way (only visible for the outer conductor 102 in FIG. 9). Along its length, outer surface of the corrugated cable 100 accordingly comprises a sequence of circumferential projections and circumferential recesses in alternating order. The dielectric 103 that is arranged between the inner conductor 104 respectively the outer conductor 102 is not solid, but has a star-shaped cross section with radial ribs 103a and/spacing (not referenced) between the ribs.

In the following, the diameter of a corrugated cable is generally referred to as the maximum diameter, that is the diameter of the projections. The centre axis of the generally rotational symmetric and straight or curved/bend cable is referred to as "cable axis". The phrase "cable axis" particularly refers to the axis of an end section of a cable to be stripped.

When preparing an end section of such a cable for its connection particularly by stripping, it is of utmost importance that dirt, chips, and the like must not remain in the spacing between the ribs 103a, since any such contamination would negatively affect the electrical and particularly HF properties of the cable. To enable correct subsequent connecting of the corrugated cable 100, the sheath 101, the outer conductor 102, and the dielectric 103 need to be removed on different lengths as indicated by distances l1, l2, l3 in FIG. 9. The phrase "stripping length" is the length on which each layer is removed, i. e. corresponds to l3 for the dielectric, l2+l3 for the outer conductor, and l1+l2+l3 for the sheath in the example of FIG. 9.

For a typical corrugated cable 100, both the outer conductor 102 and the inner conductor 104 are solid, residing in the corrugated cable 100 being comparatively stiff. In other embodiments, this may not be the case and the outer conductor 102 and/or the inner conductor 104 may be stranded.

SUMMARY OF DISCLOSURE

Under typical industrial or generally commercial conditions, a large number of cables respectively cable end sections needs to be stripped within short time frame and a lowest possible failure rate. While failures are generally undesirably, it is particularly noted that the cables ends are typically cut to the required length prior to the stripping and are in many cases already installed in a cable tubing, cable channel or the like. Stripping failures are therefore likely to cause considerable time delay and/or costs.

Particularly for corrugated cables as shown in FIG. 9, sawing is generally today typically used for the stripping, resulting in chips being generally avoidable. Extensive cleaning work is accordingly required prior to connecting the corrugated cable.

It is a general object of the present invention to improve the state of the art with respect to the stripping cables and in particular HF cables. Particularly, the situation with respect to one or more of the above-mentioned problems of the state of the art shall be improved.

The general object is achieved by the subject of the independent claims. Particularly favourable and further exemplary embodiments are further defined by the dependent claims and the overall disclosure of this present document.

According to aspect, the overall object is achieved by a stripping tool. An exemplary stripping tool includes a cutting unit with at least one blade, a cable seat, and a kinematic structure. The kinematic structure is operatively coupled with the cutting unit to move a cable that is received by the cable seat and the at least one blade with respect to each other radially to and rotationally around a tool axis. The rotational relative movement between the cable and the blade is particularly a relative movement between the circumference of the cable and a cutting edge to the As explained further below in more detail, the rotational movement is a cutting movement and the radial movement is a feeding movement of the at least one blade relative to the cable.

The relative movement between the cable and the at least one blade, particularly the cutting edge of the at least one blade, may be compensatory guided, biased, or a combination thereof.

In typical embodiments, the cable seat is formed by a longitudinal structure that extends along the tool axis and has a generally cylindrical or conical inner space for receiving the cable. Typically, a centre line of the inner space coincides with the tool axis. Further in typical embodiments, the cable seat and the cutting unit, at least in part, arranged inside a housing of the stripping tool. In operation, the cable seat may support the cable with respect to the cutting force that is exerted by the at least one blade, thereby serving as cutting force abutment. Alternatively, a separate cutting force abutment may be serve as cutting force abutment or a separate cutting force abutment may be present.

In operation, the cable axis further coincides with the tool axis. In typical embodiments as discussed in the following, the cable to be stripped is further fixed with respect to a reference coordinate system that is, e. g. attached to a housing part of the stripping tool and is maintained during operation of the stripping tool, while the at least one blade is moved radially with respect to and rotationally around the cable. Alternatively, however, the radial and/or rotational movement may be carried out, fully or partly, by the cable. In some embodiments, the tool axis is further fixed with respect to the reference coordinate system respectively to a housing part.

In some embodiments as discussed further below in more detail, the cable seat is further designed to receive the cable such that at least a part of the cable seat and the cable are rotatable with respect to each other around the tool axis.

The stripping tool is particularly advantageous and may be particularly designed and/or suited for the stripping of corrugated cables as explained above with reference to FIG. 9. The stripping tool may, however, also be designed and/or suited for stripping other types of cables, e.g. other types of coaxial cables.

According to a further aspect, the overall object is achieved by a method for stripping a cable end section. The method may include the end section of the cable and at least one blade with respect to each other radially to and rotationally around a tool axis, wherein the radial movement is a feed movement and the rotational movement is a cutting movement, the method further including controlling and coordinating the radial movement and the rotational movement via a kinematic structure.

In some embodiments of the method, the cable is a coaxial cable, such as a corrugated cable. The method may include cutting a sheath, an outer conductor and a dielectric of the cable with a sheath blade, an outer conductor blade and a dielectric blade, respectively. The method may further include controlling and coordinating movement of the sheath blade, the outer conductor blade and the dielectric blade relative to the cable end section via the kinematic structure.

Here and in the following, it is generally assumed that the cable end section is generally fixed and does in particularly not rotate about the cable axis (centre axis). This may be achieved by the cable being externally fixed and being already installed and thereby fixed, e.g. in a wall, a cable channel, or the like. The cable may also be handheld by a user of the stripping, tool and/or may be clamped by an optional clamping structure of the stripping tool or some external clamping device. Since the cutting of the at least one blade relies on an relative movement between the at least one blade and the cable, the cable may alternatively be moved while the blade does not move and remains in place, or kinematic structure may control the radial and rotational movement to be carried out partly by the at least one blade and partly by the cable.

During the stripping process, the at least one blade generally moves rotationally and radially with respect to the cable preferably in a monotonous way, that is, without changing direction. The operation of the blade(s) is comparable to a turning tool for turning recess on a turning lathe, but without the production of chips. In contrast to the latter, however, both the radial feeding movement and the rotational cutting movement are carried out by the tool for typical embodiments of the stripping tool, with the at least one blade moving rotationally around the cable and radial to the cable axis. The design of the kinematic structure and the coupling with the at least one blade is favourably designed such that the at least one blade is automatically radially retracted, that is, moved out of the cutting engagement and, e.g. back into the initial position, at the end of the stripping process. While other designs may be used as well, the cutting edge of the at least one blade is assumed to be generally straight.

The radial movement of the at least one blade is from an initial retracted position where the at least one blade is spaced apart from the cable towards the tool axis. The movement of the at least one blade towards the tool axis terminates in a advanced radial position where the radial distance to the tool axis is smallest and the cutting is generally complete.

In typical embodiments, the movement of the at least one blade is further orthogonal or substantially orthogonal to the tool axis, resulting in the cut surfaces of the cable being substantially orthogonal to the cable axis. In some embodiments, the at least one blade may cut into the cable at a different angel, resulting in the cut to be inclined with respect to the cable axis.

The particular advantages of using a stripping tool according to the invention as compared to sawing are achieved by the controlled continuous movement of the at least one blade, rather than a reciprocal radial back-forth movement that is required in a sawing process. Furthermore, the advantages are achieved by the blade being continuous rather than toothed. By this means, the occurrence of chips is avoided.

Furthermore, the design of the stripping tool and the control of the blade movement via the kinematic structure ensures that each blade moves relative to the cable along a well-defined path and stops in a correct advanced radial position, without cutting into further layers.

In an embodiment, the cutting unit includes a number of blades. For many cables such as coaxial cables, the stripping involves the removal of a number of concentric material layers. Typically, a dedicated blade is present for each of the layers. For the case of a corrugated cable as shown in FIG. 9 and many other types of cables, such as coaxial cables, the layers that need to be removed for the stripping process are the sheath, the outer conductor and the dielectric. A cutting unit with more than one blade is also referred to as "multi-blade cutting unit in the following". The single blades of the cutting unit may particularly arranged such that stripped end section of the cable has the stepped cross section from the outermost layer to the innermost layer.

For stripping coaxial cables, the cutting unit may include a sheath blade, an outer conductor blade and a dielectric blade.

The single blades are generally arranged in a defined geometric relation with respect to each other. In typical embodiments, the single blades of a multi-blade cutting unit are of generally identical and for example flat and sheet-like design. They may, however have different dimensions, such as different lengths and thicknesses, be made of different materials and have different grinding of the cutting edges in accordance with the requirements of the single layers to be cut. In alternative embodiments, however, the single blades may have different geometric designs.

The single blades of a multi-blade cutting unit may generally be arranged and coupled to the kinematic structure to move separately from each other relative to the cable, for example with different speeds and/or different paths relative to the tool axis and the cable to be stripped. In a typical arrangement, however, the single blades of a multi-blade cutting unit are fixed relative to each other. They may particularly be attached to and hold by a typically rigid cutting unit body, thus forming a compact unit. For such embodiments, the cutting unit body with single blades moves as a whole relative to the cable and the single blades are moved together and without relative motion between them. The single blades of the multi-blade cutting unit may especially be arranged parallel to each other and axially spaced apart, resulting in the different layers being cut at different axial positions of the cable, corresponding to the different stripping distances as shown in FIG. 9 and explained before. The single blades and particularly the cutting edges of the single blades are typically further radially spaced apart with respect to each other. The radial arrangement of the single blades is such that, in the advanced radial position and at the end of the cutting process, the cutting edge of each blade is, in the advanced radial position, at or close to the circumferential boundary surface between the layer that is cut by each blade and the neighbouring inner layer. For the corrugated cable of FIG. 9, for example, the advanced radial position of the cutting edge of the sheath blade may be at the boundary surface between the sheath 101 and the outer conductor 102; the cutting edge of the outer conductor blade may be at the boundary surface between the outer conductor 102 and the dielectric 103; the cutting edge of the dielectric blade may be at the boundary surface between the dielectric 103 and the inner conductor 104. Favourably, the advanced radial position for each of the blades is further selected such that the cutting edge is closed to the mentioned boundary surfaces, but does not cut into the neighbouring inner layer. The retracted position of the single blades is favourably selected such that none of the blades contacts and cuts into the cable.

The single blades of a multi-blade cutting unit may be circumferentially aligned or distributed around the tool axis respectively the cable.

In an embodiment, the stripping tool includes a locking member for axially locking the cable with respect to the at least one blade. The locking member may be operatively coupled with the kinematic structure to move the locking member radial to the tool axis. In some embodiments of the method, the method may include axially locking the cable with respect to the blade via a locking member engaging a circumferential recess of a cable sheath.

In an embodiment, a locking member is shaped to engage a circumferential recess in a cable sheath. For this type of embodiment, the locking member may have the shape of a two-prong fork, with the prongs engaging the circumferential recess of the cable sheath. In addition to axially locking the cable, the locking member may axially position the cable with respect to the at least one blade. With reference to FIG. 9, the prongs of a locking member of the before-mentioned type, when radially touching and starting engagement with the corrugated cable sheath 101, will, due to the corrugated design of the cable 100, axially move the cable 100 with respect to the locking member such that the prongs finally are located in a recesses between two axially neighbouring projections. A locking member, e.g. a prong-shaped locking member, may be arranged proximal or distal from the at least one blade. For a multi-blade cutting unit, e.g. a multi-blade cutting unit with parallel blades as discussed before, the locking member may also be arranged between e. g. axially neighbouring blades.

The coupling between the locking member and the kinematic structure is favourably such that the locking member engages and radially locks the cable before the first blade touches the cable.

In an embodiment, a locking member is coupled to at least one blade to move together with this blade. In an embodiment with a number of parallel blades as discussed before, the locking member may particularly be arranged parallel to the blades and may be rigidly coupled with the blades. In such a cutting unit, all blades and the locking member accordingly move together. The locking member may particularly be attached to or part of a cutting unit body.

As explained before, the at least one blade moves rotationally with respect to the cable. For an embodiment where a locking member forms a common unit and moves together with the at least one blade, it follows that the locking unit also moves around the cable. While axially fixing the cable, the prongs should accordingly be sufficiently radially spaced to allow movement relative to the cable with no or little friction.

In an embodiment, the cutting kinematic structure includes a linear guide. The linear guide may be operatively coupled to the at least one blade to guide the radial movement of the at least one blade. The linear guide of this type of embodiment guides the cutting unit, for example a multi-blade cutting unit with a cutting unit body as discussed above, on its linear radial path between the retracted and the advanced radial position and favourably back to the retracted position. The force/torque for rotating the at least one blade relative to the cable may be transmitted to the at least one blade via the linear guide in some embodiments.

In an embodiment, the kinematic structure includes a cam structure: The cam structure controls relative radial movement between the at least one blade and the cable. In an embodiment, the cam structure is arranged around the cutting unit. The cam structure may particularly be formed by an inner surface of a generally cylindrical or drum-shaped hollow structure that may be arranged around the cutting unit as control rotor. A longitudinal axis of the cylindrical or drum-shaped hollow structure may coincide with the tool axis. The cylindrical or drum shaped hollow structure and particularly the cam structure is not necessarily circumferentially continuous but may also be formed by one or more sections of a hollow structure. A single cam structure may be used to control radial movement of the at least one blade when advancing from the most retracted to the advanced and back to the retracted position. In a alternatively preferred embodiments, an advancement cam is foreseen which controls the advancement and the cutting operation of the cutting unit and the at least one blade, an a separate back-pushing cam is provided to control the retraction of the at least one blade and/or to push the cutting unit back to the retracted position. An advancement cam and a back-pushing cam may for example be arranged one after the other along the tool axis.

The cutting unit may include a tracking member that movably engages the cam. The cam interface structure may, for example, be realized by at least one pin or reel and may be mechanically coupled to the cutting unit. In embodiments where the cutting unit is a compact multi-blade cutting unit with a fixed arrangement of the blades, the tracking member may be rigidly coupled to other component s of the cutting unit, particularly the blades. In some embodiments that are particularly favourable with respect to friction, the tracking member may be realized by a rotational bearing, such as a miniaturized ball bearing, the axis of which is attached to a cutting unit body and the outer circumferential surface of which radially engages and rolls on the cam structure.

In an embodiment with more than one cam, such as an advancement cam and a back-pushing cam, a separate tracking member may be present for each of the cams.

Tracking members may be biased, particularly radially biased against the corresponding cam structure via one or more biasing members that are typically realized as elastic element(s), for example one or more coil spring(s). Alternatively or additionally, a cam structure may be elastic or may be elastically biased against the corresponding tracking member. Alternatively or additionally to a biased engagement, a positive guide may be foreseen.

The advancement force for radial advancement of the at least one blade may be transmitted from the cam structure, particularly an advancement cam, to the at least one blade via coupling of the cam structure with the corresponding tracking member in some embodiments.

In an embodiment, the cam structure and the cutting unit are operatively coupled such that the at least one blade and the cam structure move around the tool axis with different rotational speed. This type of embodiment may for example be realized with the cam structure being arranged circumferentially around the cutting unit as explained before. The cutting movement is given by the movement of the cutting unit around the tool axis and the cable—in this embodiment—non-rotating cable, while the radial position of the at least one blade is controlled by the relative rotational positions and movements of the cutting unit, particularly a tracking member of the cutting unit, and the cam structure. The operatively coupling may particularly be such that the rotational speed around the tool axis is slightly different for the at least one blade and the cutting unit. For example, the cam structure may rotate slightly slower than a multi-blade cutting unit as explained before. By way of example, the ratio may be 16:15, or n:(n−1) That is, the cam structure rotates (n−1) times for n rotations of the cutting unit. Also, for n rotations of the cutting unit, there will be one relative revolution between cutting unit and cam structure. The full stripping process with the at least one blade moving from its initial retracted to its advanced radial position and back to the retracted position is accordingly carried out during n rotations of the at least one blade around the tool axis. In an exemplary embodiment, the cutting unit and the cam structure are arranged to rotate in the same rotational direction. In alternative embodiments however, they may also rotate in opposite directions.

In an exemplary design, the stripping tool comprises a central rotor that extends along the tool axis and is beared rotatable around the tool axis, and the at least one blade is rotationally coupled to the central rotor to rotate together with the central rotor at the same rotational speed. Radially, the cutting unit of such an embodiment is arranged movable with respect to the central rotor for advancing and retracting the cutting unit and in particular the blades.

In embodiments with a linear guide as discussed above, the cutting unit with the at least one blade may be coupled to the central rotor via the linear guide and the linear guide may transmit a tangential cutting force from the central rotor to the at least one blade.

The central rotor may have a cable receiving space that serves as cable seat and receives, in operation, the end section of the cable to be stripped. The cable receiving space may, e. g. have the shape of a cylindrical or conic throughgoing or bore-like opening or of a recess that extends from a proximal end of the central rotor in alignment with the tool axis. For such embodiments, the centre axis of the cable receiving space may accordingly coincide with the tool axis. The cable receiving space is dimensioned to receive the end section of the cable to be stripped. During the stripping process, an circumferential inner wall of the central rotor may serve as cutting force abutment for the radial force that is exerted by at least one blade onto the cable.

In an embodiment, the stripping tool includes a coupling gear. The coupling gear operatively couples the cutting unit and the cam structure. Generally, the coupling gear may have any desired number of stages. In a typical embodiment, the coupling gear is a two-stage gear. The coupling gear may for example be a toothed wheels gear, particular an external toothed wheels gear. The coupling gear may especially couple the cutting unit and the cam structure In an exemplary embodiment with a control rotor that includes a cam structure cam structure and with a central rotor as explained before, the coupling gear may have a first stage input toothed wheel that is rigidly operatively coupled to or formed integral with the central rotor, e. g. at or as a proximal end section of the central rotor. The coupling gear may then further include a second stage output toothed wheel that is rigidly operatively coupled to or formed integrally with the control rotor, e. g. at or as a proximal end section of the control rotor. The first stage input wheel and the second stage output wheel may be arranged axially side by side and coaxial around the tool axis. One or more intermediate toothed wheel pairs, with each intermediate toothed wheel pair comprising a first stage output toothed wheel and a second stage input toothed wheel on a common axis may be arranged such that the first stage output toothed wheel meshed with the first stage input toothed wheel and the second stage input toothed wheel meshes with the second stage output toothed wheel. The axis or axes of intermediate toothed wheel pair(s) may be parallel to and radially spaced apart from the tool axis. Typically, the rotational axis or axes of the intermediate toothed wheel pair(s) is/are fixed with respect to the tool axis. Typically, the teeth number of the first stage input toothed wheel respectively the second stage output toothed wheel are considerably larger than the teeth number of the first stage output toothed wheel and the second stage input toothed wheel, respectively. It is noted that different types of gear designs may be used as well, for example a friction wheel gear. For such a design, the central rotor and the control rotor are coupled to rotate around the tool axis in the same rotational direction but with different rotational speeds.

In an embodiment, the kinematic structure includes a drive coupler, wherein the drive coupler is configured to receive a driving force/torque. In operation, the driving force/torque moves the at least one blade with respect to the cable. Typically the at least one blade is moved both rotationally and radially with respect to the cable.

In an embodiment, the drive coupler is arranged to rotate around the tool axis. In an embodiment with a central rotor that is coupled to the cutting unit to rotate together around the tool axis, the drive coupler may be coupled to or formed integrally with the central rotor and receive a driving torque around the tool axis as sole driving force/torque.

In an embodiment, the drive coupler and the at least one blade are operatively coupled to move around the tool axis at the same rotational speed.

In an embodiment, the cutting unit is arranged removable from the kinematic structure, in particular removable from a cutting tool housing. For this type embodiment, the cutting unit may be removed for replacement, blade grinding/ sharpening or the like. The cutting unit may particularly be arranged to be radially removable via a corresponding cutting unit replacement cut-out of the housing.

According to a further aspect, the overall object is achieved by a cutting unit for use in a stripping tool. The cutting unit may include at least one blade. The cutting unit may further include a tool interface structure. The tool interface structure may be configured to operatively coupe to a cutting unit interface structure of the stripping tool, the operative coupling controlling, in operation, the at least one blade to move radial to and rotationally around a tool axis.

The cutting unit may especially be a cutting unit for use as part of and/or in combination with a stripping tool as described above as well as further below. The cutting unit may include one or more bushings that is/are designed for operatively engaging one or more guiding pin(s) and forming, in combination with the one or more guiding pin(s), a linear guide. In an embodiment, the cutting unit further forms a tracking member that is designed to operatively couple to a cam as explained before and further below.

According to a still further aspect, the overall object is achieved by a cable, in particular a coaxial cable, the cable having a cable end section stripped by applying a method according to the present disclosure and/or using a stripping tool according to the present disclosure.

Generally, methods for stripping a cable may especially be carried out using stripping tools in accordance with the present disclosure. Therefore, exemplary and/or preferred embodiments of stripping tools disclose, at the same time, corresponding methods of stripping tools that may be carried out with such stripping tools.

BRIEF DESCRIPTION OF FIGURES

FIG. 9 shows a stripped end section of a corrugated cable;

FIGS. 10a and 10b show further embodiments of a stripping tool;

EXEMPLARY EMBODIMENTS

In the following, exemplary embodiments are discussed in more detail with additional reference to the figures. Elements that occur in an identical or substantially identical way in a number of figures are typically not referenced in all of them. Furthermore, where elements are present more than once in the same or substantially the same way, not all of them are generally referenced. It is further noted that directional terms, such as "top", bottom", proximal", distal", generally refer to the drawings and are intended to support the reader's understanding. They do not imply any particular directions or orientations for the application.

Figure 1:
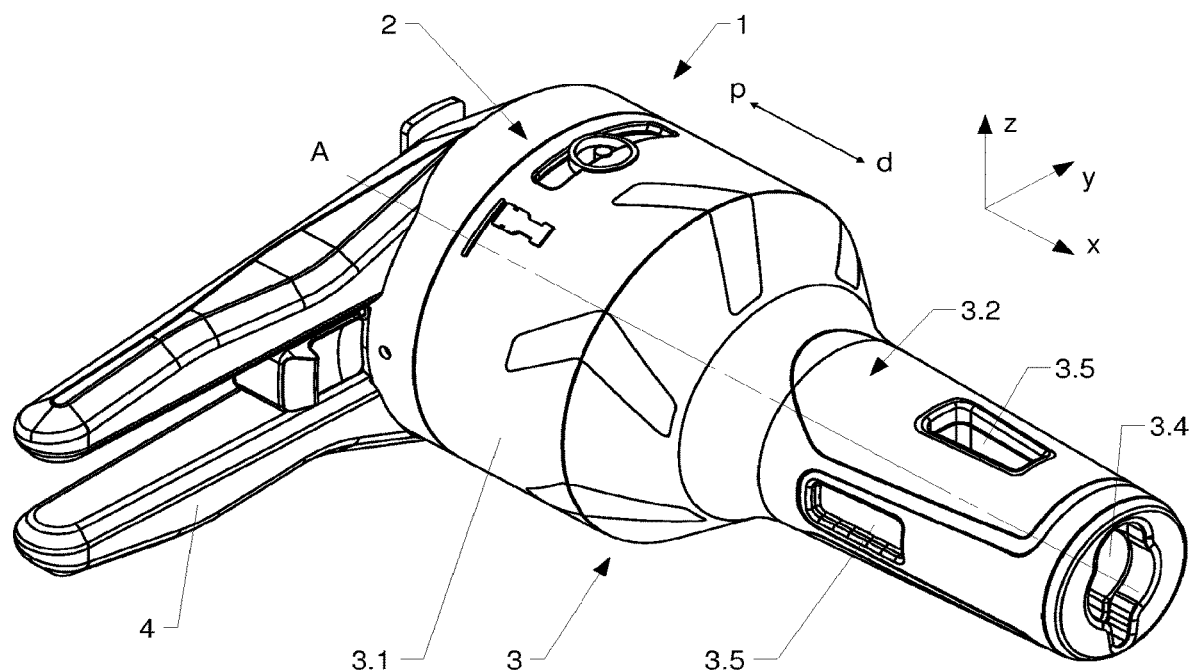
FIG. 1 shows a stripping tool in schematic perspective view.
Figure 2:
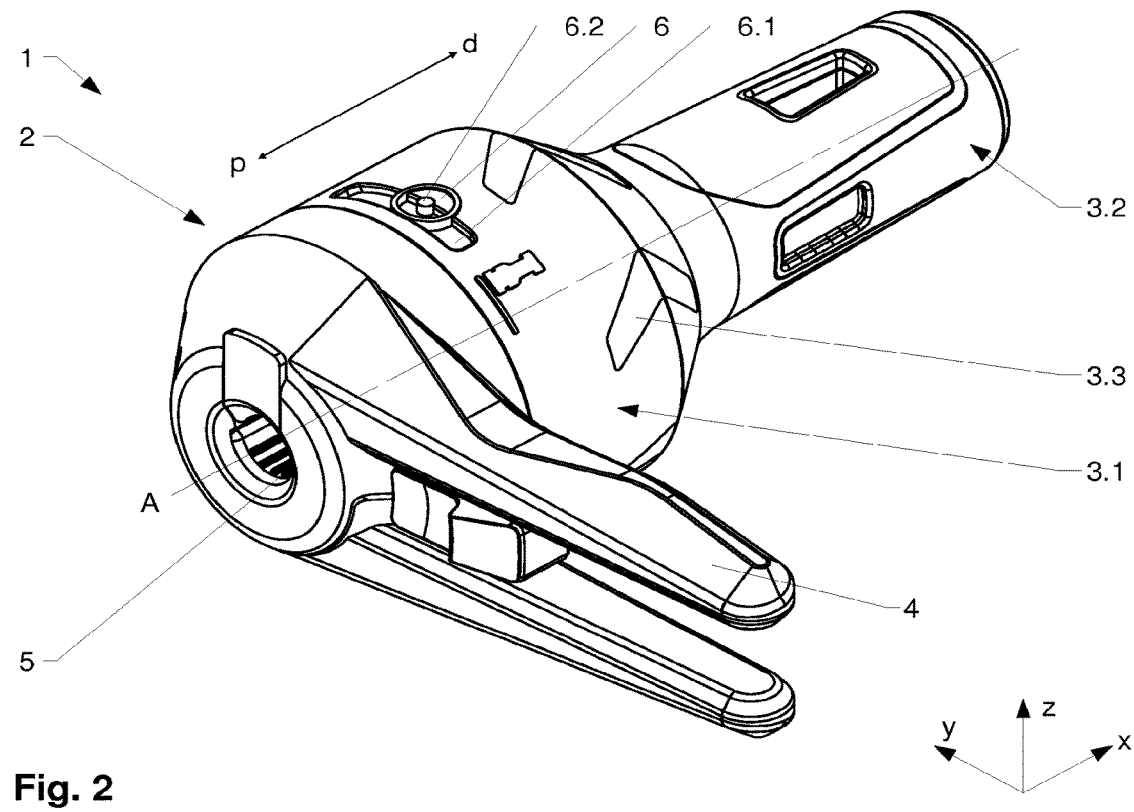
FIG. 2 shows a stripping tool in a further perspective view.

Reference is first made to FIG. 1 and FIG. 2, respectively. FIG. 1 and FIG. 2 show an exemplary stripping tool 1 in two perspective views. The housing of the stripping tool 1 includes a first housing part 2 and a two-parted second housing part 3 with components 3.1, 3.2. Alternatively, the second housing part 3 may be made of one piece. In this specific example, the first housing part 2 further comprises an optional handle 4. The first housing part 2 and the second housing part 3 are rotatable with respect to each other about a central tool axis A as explained further below in more detail.

When viewed along the tool axis A, the side of the tool 1 with the first housing part 2 is referred to as "proximal" side" of the tool 1 and the opposite side is referred to as "distal side". Corresponding proximal respectively distal directions are indicated by "p" respectively "d" in FIG. 1 and FIG. 2. For the application of the stripping tool 1, the cable end section to be stripped is inserted into the stripping tool 1 from its proximal end.

The first housing part 2 comprises a through-going cable receiving opening 5 in axial alignment with the tool axis A. The cable end section to be stripped is inserted into the stripping tool 1. As will be visible further below, the cable receiving opening 5 is aligned with channels or openings in further components of the stripping tool 1, thus forming an axially continuous cable receiving channel inside the stripping tool 1 that further serves as cable seat.

In the shown embodiment, the cable receiving opening 5 includes a clamping structure in form of inwardly clamping elements, such as protrusions and/or axial or radial ribs for clamping, particularly radially clamping, the cable end section with first housing part 2. In its proximal section, the first housing part 2 somewhat radially elastically, such that the opening of the cable receiving opening can be reduced by exerting a radial inwards direction force via the handle 4. Optionally, the clamping may be locked via a locking mechanism, e. g. a ratchet mechanism, and released by operating a release button (not referenced that is arranged between the limbs of the handle 4.

For operating the stripping tool 1, the first housing part 2 with the handle 4 is gripped by a user with one hand and the second housing part 3 is rotated against the first housing part 2 around the tool axis. Thereby, the second housing part 3 serves as drive coupler for providing a driving force/torque for operation of the stripping tool 1. The rotational direction as indicated by optional indication arrows 3.3 which are provided on second housing part 3. At its distal end, the second housing part 3 further comprises an external drive coupler 3.4. Via the external drive coupler an for example electric drive, such as an electric screw driver, can be operationally coupled to the second housing part 3 to rotate the second housing part 3 rather than rotating it by hand.

Optional windows 3.5 are further present in the components 3.1, 3.2 of the second housing part 3.

For the operation, it is further assumed that the cable end section to be stripped is rotationally fixed with respect to the first housing part 2, i. e. does not rotate, and the first housing part 2 substantially maintains its position and orientation. In many practical cases, the cable will already be installed and thereby fixed. Alternatively, the cable may be handheld together with the first housing part 2 and the optional handle 4, and/or may be at least radially clamped via clamping elements inside the first housing part 2 as explained before.

The stripping tool 1 further includes an optional progress indicator 6 as explained further below.

Figure 3:
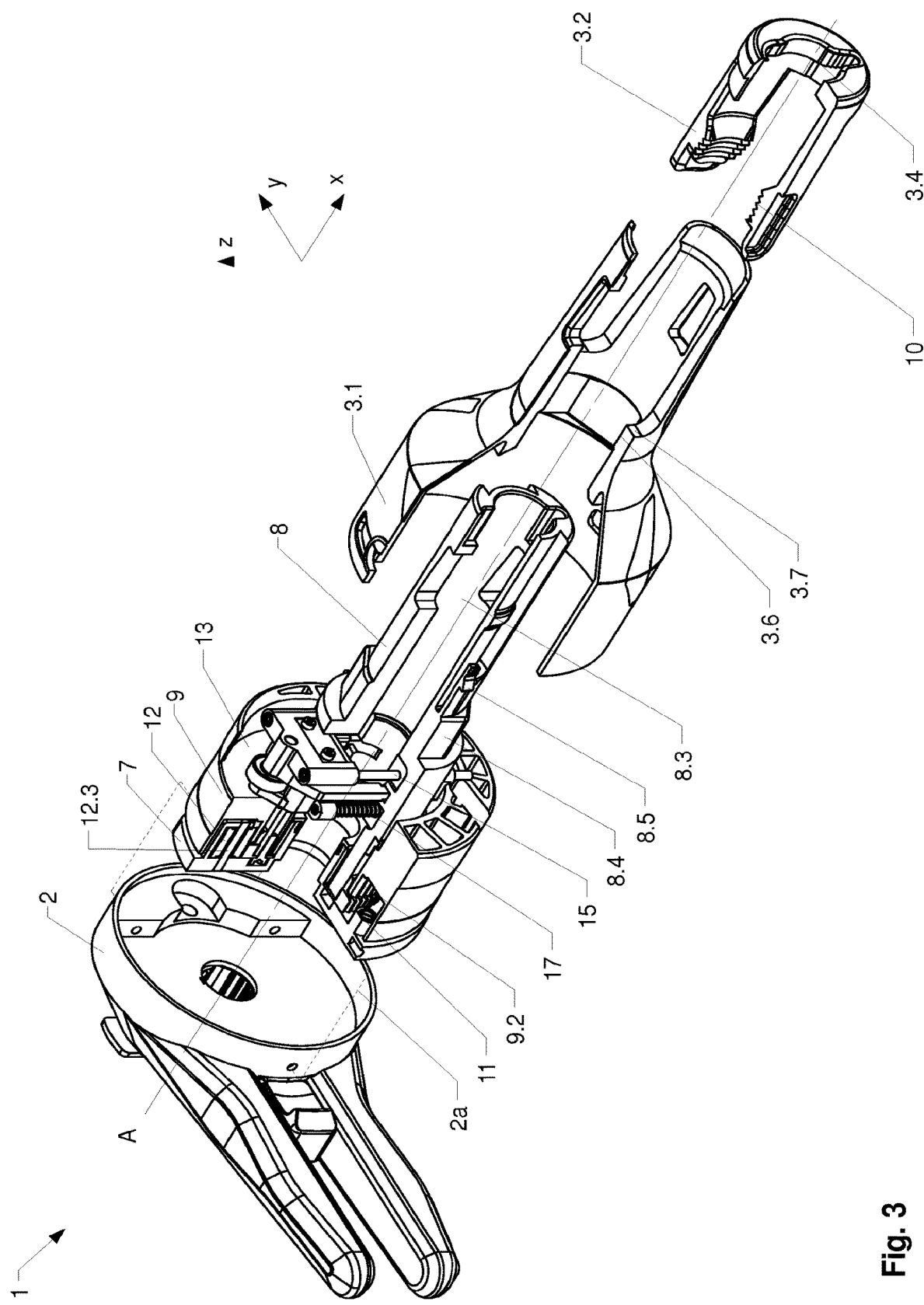
FIG. 3 shows a stripping tool in a partly exploded and cut-away perspective view.
Figure 4:
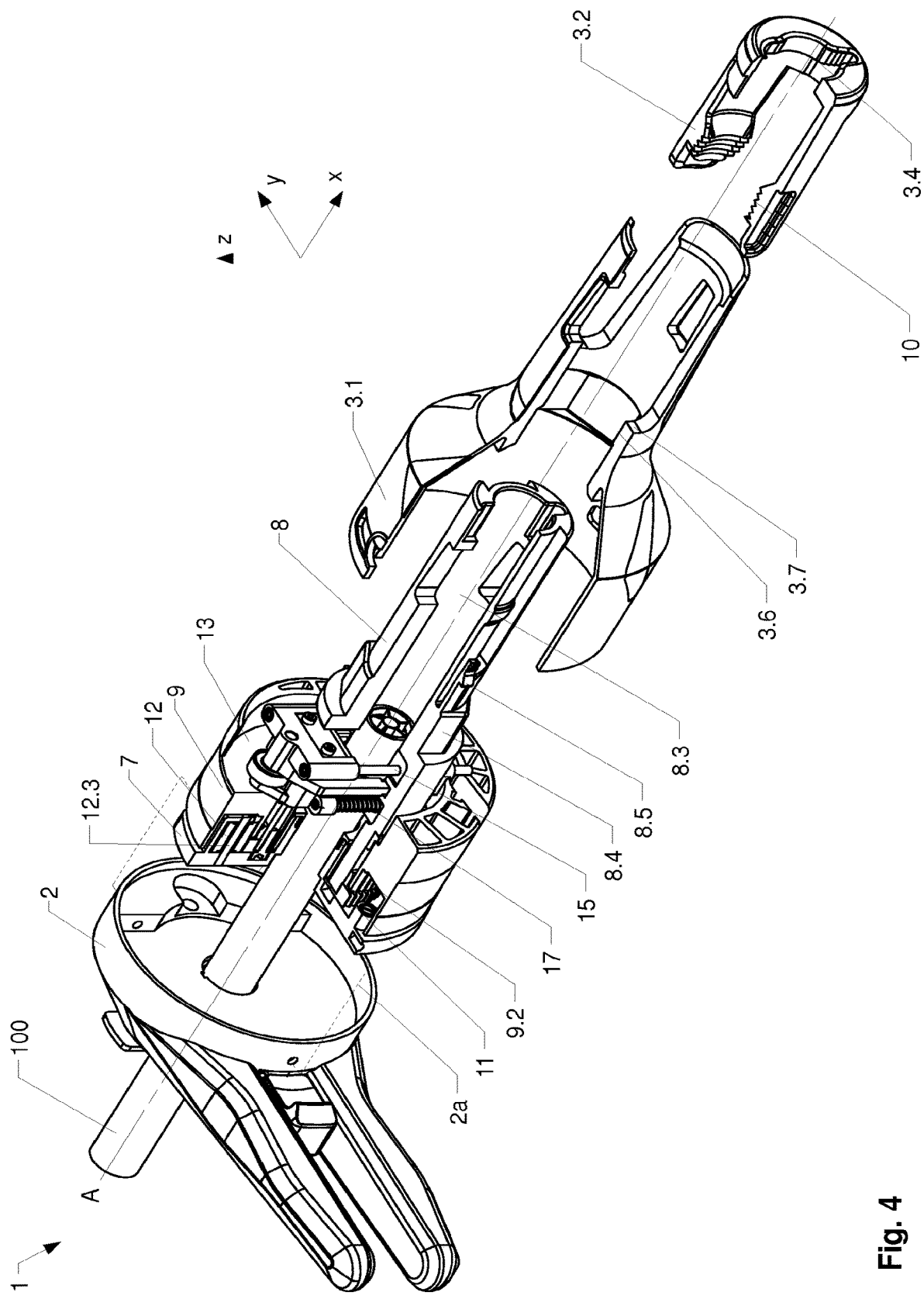
FIG. 4 shows a stripping tool in a partly exploded and cut-away perspective view together with a cable end section to be stripped.

In the following, reference is additionally made to FIG. 3 and FIG. 4. FIG. 3 and FIG. 4 both show a partial sectional view of the stripping tool 1, with the first housing part 2, and the components 3.1, 3.2 of the second housing part 3 being spaced apart from each other along the tool axis A for better showing the internal design of the stripping tool 1 and particularly the kinematic structure. FIG. 3 and FIG. 4 are different in that FIG. 3 only shows the stripping tool 1, while FIG. 4 additionally shows an end section of the corrugated cable 100 as example for an cable end section to be stripped.

The kinematic structure includes a stator 7 that is arranged in and secured inside a distal recess 2a of the first housing part 2 in a rotational locked way, for example via radial and/or axial screws and/or bolts (not shown in detail). Alternatively, the stator 7 may be formed integral with the first housing part 2.

The kinematic structure further includes a central rotor 8 and a control rotor 9. In the shown example, the stator 7, the central rotor 8 and the control rotor 9 are arranged coaxial about the tool axis A, with the control rotor 9 being arranged around a section of the central rotor 8, and the stator 7 being arranged proximal from the central rotor 8 and the control rotor 9. The stator 7, the central rotor 8, and the control rotor 9 are arranged rotatable with respect to each other about the tool axis A and are kinematically coupled via a coupling gear as described further below. In the shown example, the proximal section of the second housing part 3.1 is a bell-shaped or can-shaped with an open proximal base that faces the first housing part 2. A section portion of the central rotor 8, the control rotor 9 and a cutting unit 13 as discussed further below are arranged inside the bell-shaped or can-shaped section. The central rotor 8 is substantially hollow and has a cylindrical cable receiving space 8.3 in axial alignment with the tool axis A, thereby serving as cable seat and cutting force abutment. Via the cable receiving opening 5, the cable receiving space 8.3 is accessible from the proximal end of the stripping tool for inserting cable end section to be stripped. Further for allowing insertion of the end section of the cable to be stripped, the stator 7 has a central through-opening (not referenced) in alignment with the cable receiving space 8.3.

The central rotor 8 further includes radially elastic snap element 8.5 that engage, in an operational state, with a surface 3.7 of component 3.1 of the second housing part 3, thus forming a snap-in lock. Via the snap-in lock, the central rotor 8 and the portion 3.2 of the second housing part 3 may be axially separated and re-connected. In an assembled state, the portion 3.2 of the second housing part and the central rotor 8 are accordingly substantially rigidly coupled to each other and may rotate around the tool axis A together. The central rotor 8 and the component 3.2 of the second housing part 3 are further rotationally locked via non-cylindrical anti-rotation contours 8.4, 3.6 with respect to each other. The portion 3.2 of the second housing part 3 is axially removable received in a distal opening (not referenced) of the portion 3.1 of the second housing part 3.1, thus forming, in operation, a common unit. The portion 3.2 of the second housing part 3 further includes a number of optional radially inward-directed chamfering blades 10 that are provided for chamfering the inner conductor 104 of the cable.

Figure 11:
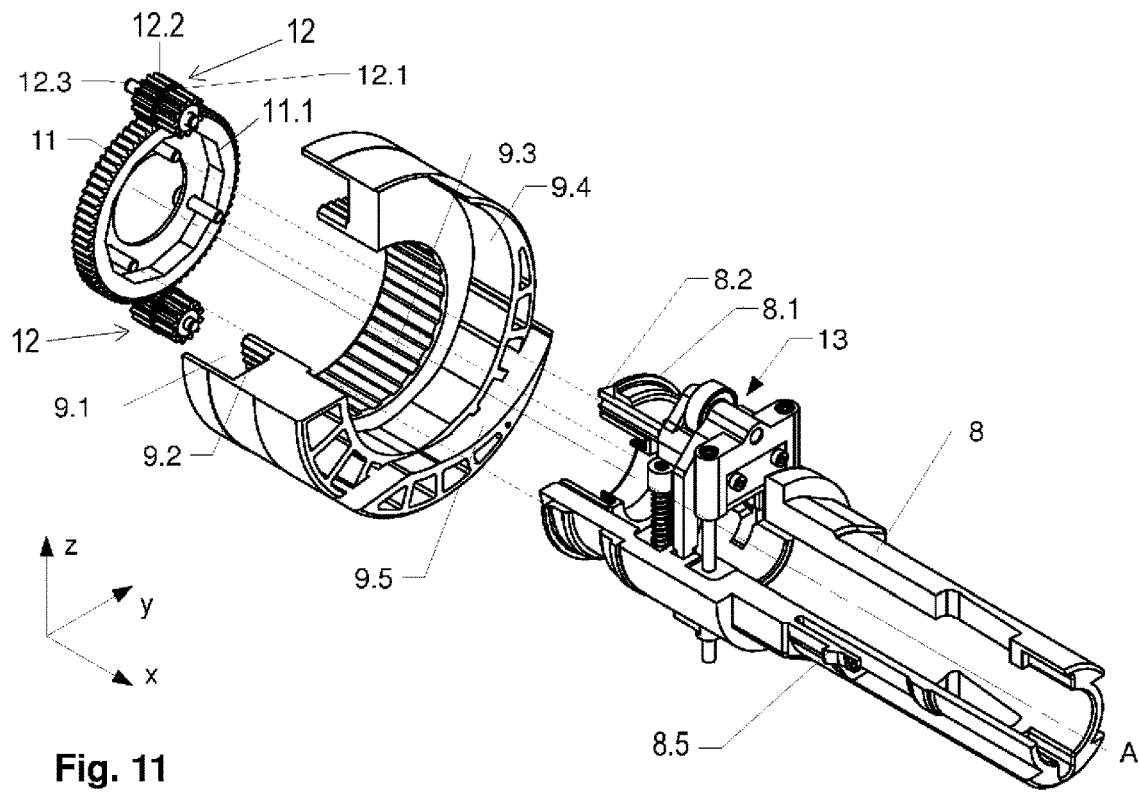
FIG. 11 shows elements of a stripping tool in a partly exploded and cut-away perspective view.

In the following, reference is additionally made to FIG. 11. FIG. 11 shows major components of the kinematic structure in a three dimensional view, with sub-assemblies of the kinematic structure being spaced with respect to each other along the tool axis A.

The control rotor 9 includes a through-going central opening (not referenced) with a circumferential inner bearing surface 9.3 which runs, in an assembled state, on a corresponding circumferential outer bearing surface 8.1 of the central rotor 8.

Figure 7:
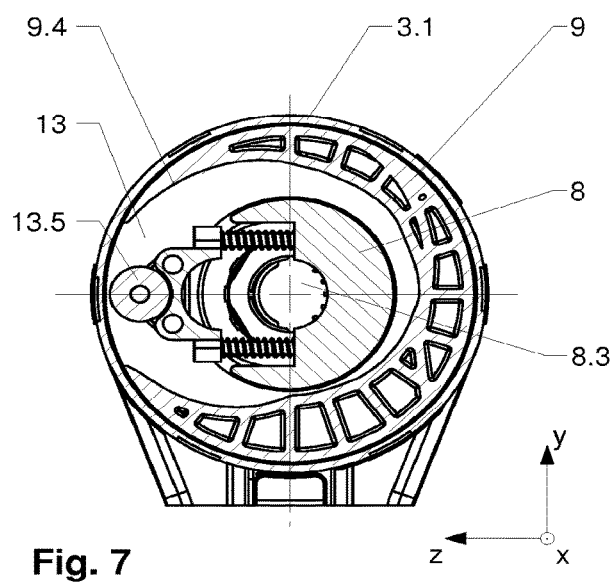
FIG. 7 shows a cut of the stripping tool according FIG. 5 along a second cutting plane; to FIG. 8 shows a cut of the stripping tool according FIG. 5 along a third cutting plane.
Figure 8:
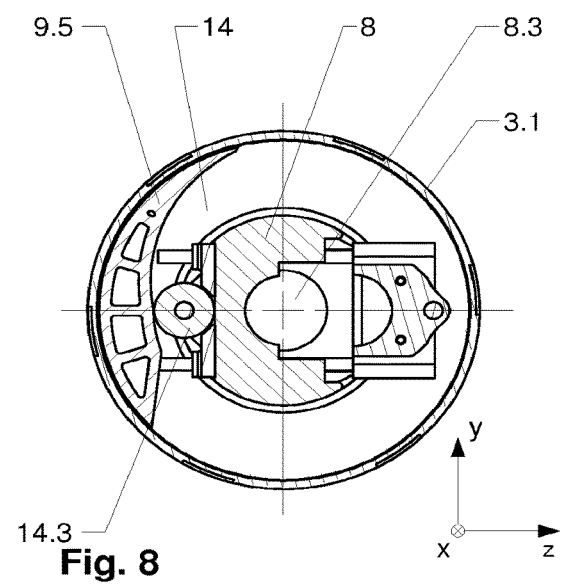

At its proximal front surface, the control rotor 9 further includes a circumferential recess 9.1. The radially inner surface of the circumferential recess 9.1 is toothed, thus forming a second stage output toothed wheel 9.2 of a two-stage coupling gear, as explained in more detail further below. In a section distal from the inner bearing surface 9.3, the control rotor 9 further includes a cam structure with an advancement cam 9.4 and a back-pushing cam 9.5, the advancement cam 9.4 being exemplarily arranged proximal from the back-pushing cam 9.5. In combination, the advancement cam 9.4 and the back-pushing cam 9.5 control radial movement of a cutting unit with a sheath blade, an outer conductor blade, and a dielectric blade, as explained further below in more detail. The advancement cam 9.4 and the back-pushing cam 9.5 are realized by a radial of a circumferential inner surface (not separately referenced) as measured from the tool axis a varying along the circumference (see also FIG. 7, FIG. 8 as discussed further below).

The kinematic structure further includes a first stage input toothed wheel 11 that is exemplarily arranged at a proximal end of the central rotor 8. The first stage input toothed wheel 11 is fixed and rotationally secured to the central rotor 8 via a non-circular distal inner contour 11.1 and a corresponding proximal outer contour 8.2 of the central rotor 8. The first stage input toothed wheel 11 is further axially secured to the central rotor 8, exemplarily by e. g. three screws parallel to the tool axis A. In operation, the central rotor 8 and the first stage input toothed wheel 11 accordingly form a common substantially rigid structure.

The kinematic structure further includes two intermediate gear pairs 12, each intermediate gear pair 12 including a pair of a first stage output toothed wheel 12.1 and a second stage input toothed wheel 12.2 that are rotationally secured on a common intermediate gear axis 12.3 and accordingly rotate together, or maybe integrally formed as the single element. The intermediate gear axes 12.3 are rotatable beard by the stator 7 and extend parallel to the longitudinal tool axis A.

In the shown example, two intermediate gear pairs 12 are foreseen for symmetry reasons that are arranged diametrically with an angle of 180° on the stator 7. In slightly modified embodiments, however, another number of intermediate gear pair 12 may be present, for example three pairs of intermediate gear pairs 12 with an angle of 120°, or only a single intermediate gear pair 12. The intermediate gear pairs 12 are arranged such that the first stage output toothed wheel 12.1 meshes with the first stage input toothed wheel 11 and the second stage input toothed wheel 12.2 meshes with the second stage output toothed wheel 9.2. The first stage input toothed wheel 11 and the second stage output toothed wheel 9.2 are further arranged in a coaxial way around the tool axis A, with the second stage output toothed wheel 9.2 being distal from the first stage input toothed wheel 11. The number of teeth of the second stage output toothed wheel 9.2 is somewhat larger than the number of teeth of the first stage input toothed wheel 11. The number of teeth of the first stage output toothed wheel 12.1 is somewhat larger than the number of teeth of the second stage input toothed wheel 12.2. Consequently, if the central rotor 8 is rotated with respect to the stator 7 (and accordingly the first housing part 2) in a first rotational direction, the control rotor 9 will rotate into the same rotational direction, but with a slightly smaller angular speed. With other words, the control rotor 9 will slowly rotate with respect to the central rotor 8 in an opposite second rotational direction. In an exemplary design, the two stages are dimensioned as follows. In this embodiment, the first stage input toothed wheel has 70 teeth and the first stage output toothed wheel has 14 teeth, resulting in a transmission ration of 5:1 for the first stage. The second stage input toothed wheel has a 12 teeth and the second stage output toothed wheel has 64 teeth, resulting in a transmission ration of 1:5.33 for the second stage and a overall transmission rate of 15:16 for the coupling gear as a whole. For this design, the control rotor 9 will rotate 15 times about the central axis A for 16 revolutions of the central rotor. 8.

The progress indicator 6 as visible in FIG. 1 and FIG. 2 comprises a window 6.1 in the second housing part 3 with a fixed pointer 6.2. A progress scale is arranged on the outer circumferential surface of the control rotor 9 and visible through the window 6.1. In accordance with the before-explained relative rotation between the central rotor 8 (together with the second housing part 3) and the control rotor 9, the scale and the pointer 6.2 move with respect to each other in the same way as the control rotor 9 and the second housing part 3, respectively, e. g. once for 16 revolutions of the second housing part 3.

Figure 12:
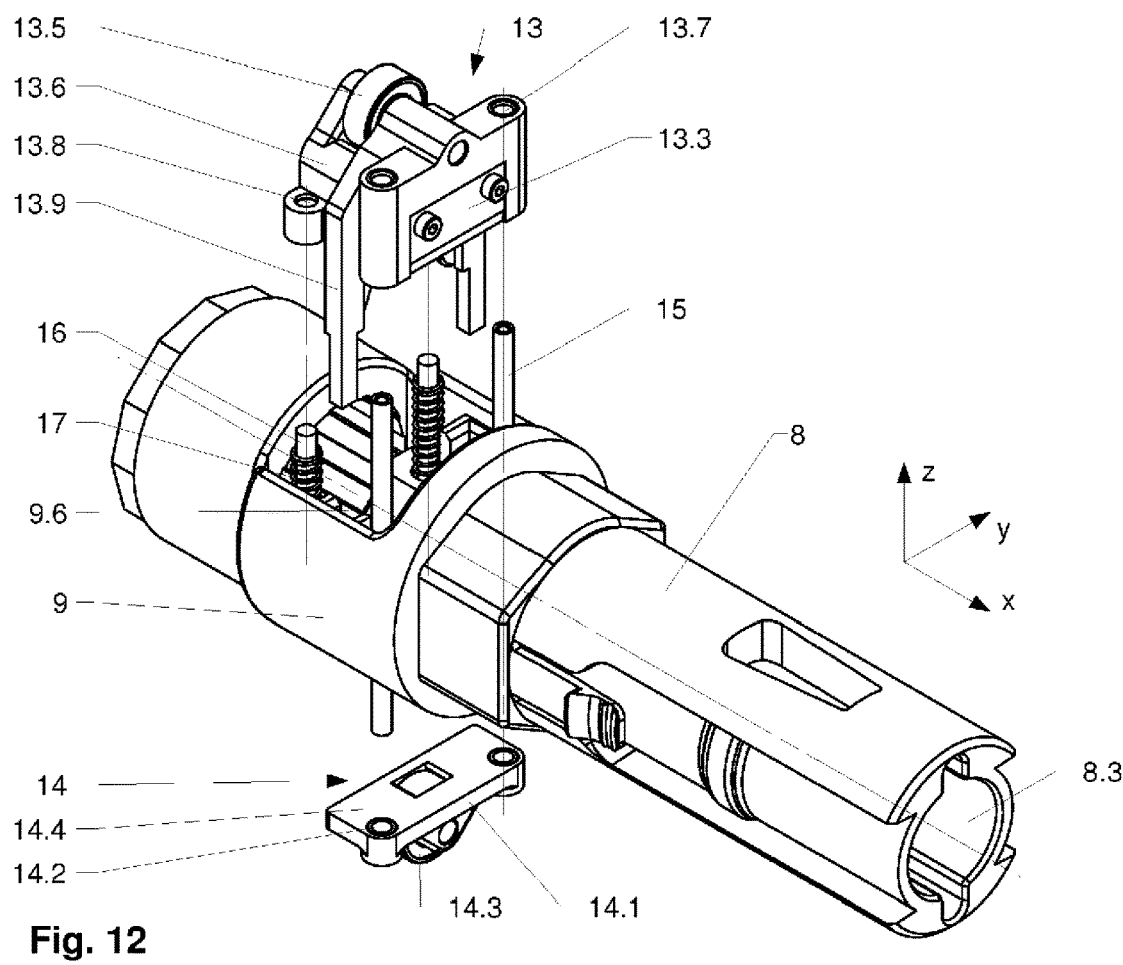
FIG. 12 shows a central rotor, a control rotor and a cutting unit of a stripping tool in a perspective view.
Figure 13:
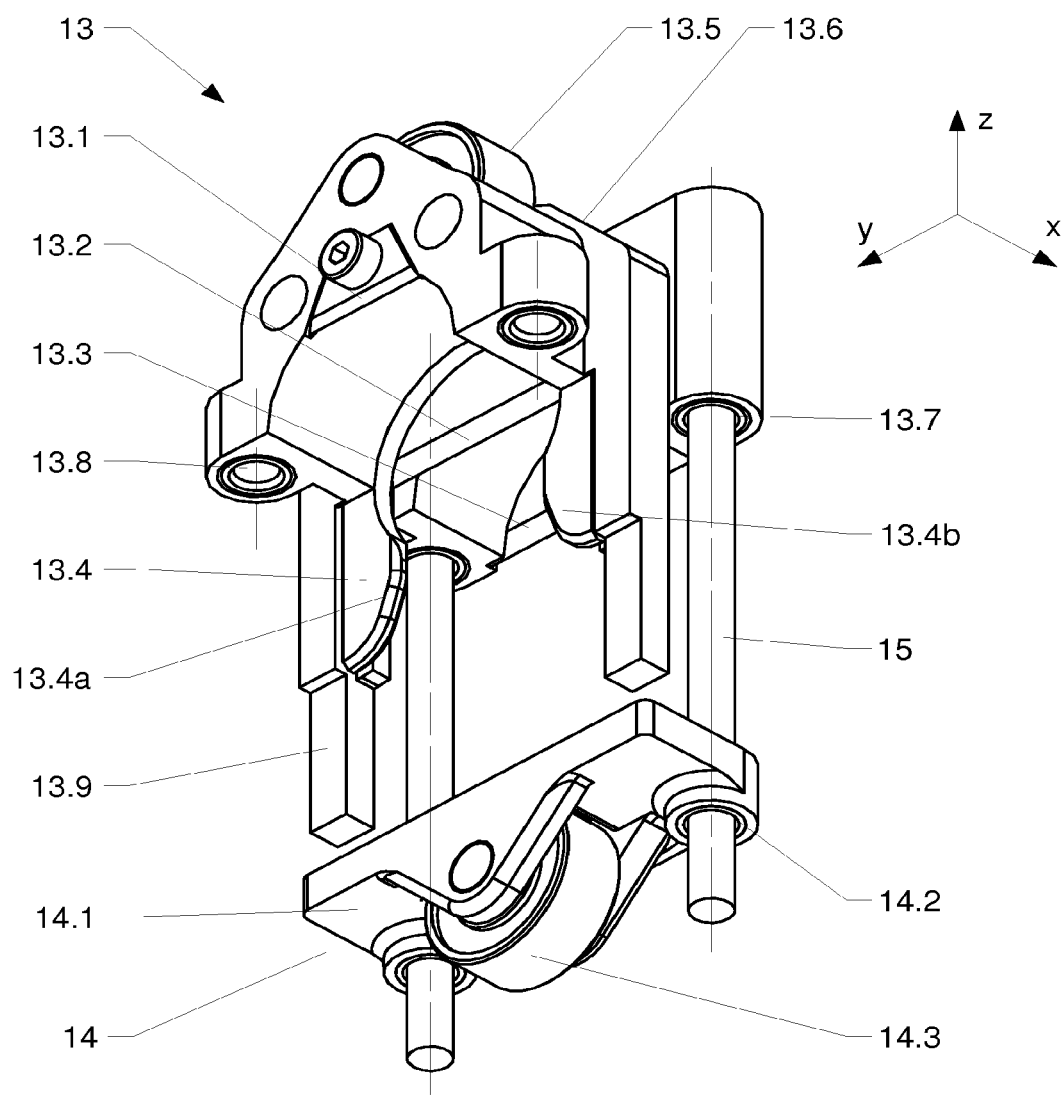
FIG. 13 shows a cutting unit for use in or with a stripping tool in a perspective view.

In the following, reference is additionally made to FIG. 12 and FIG. 13. FIG. 12 shows the central rotor 8 and the control rotor 9 in a assembled state with the cutting unit 13 and the back-pusher 14 radially spaced apart. FIG. 13 shows the cutting unit 13 together with a back pusher 14 and distal guiding pins 15 as explained further below.

The cutting unit 13 includes a sheath blade 13.1, an outer conductor blade 13.2, and a dielectric blade 13.3 in exemplarily fixed parallel arrangement. The blades 13.1, 13.2, 13.3 are hold in a cutting unit body 13.6, thus forming a compact unit.

In axial direction between the sheath blade 13.1 and the outer conductor blade 13.2, a locking member 13.4 is arranged and is attached to or integral part of the cutting unit body 13.6. The locking member 13.4 comprises prongs 13.4a, 13.4b for engaging a recess in the sheath of the cable end section to be stripped, thereby fixing and axially positioning the cable as explained above. The radial distance between the prongs 13.4a, 13.4b is selected such that the prongs safely engage the recess in the cable sheath, while enabling a rotation of the prongs 13.4a, 13.4a relative to the cable.

The cutting unit 13 further includes an advancement tracking member 13.5 that is exemplarily realized by a miniaturized ball bearing. A rotational axis carrying the ball bearing 13.5 is hold by the cutting unit body 13.6 in exemplarily parallel alignment to the tool axis A. In an assembled state, the outer circumferential surface of the ball bearing 13.5 is axially aligned with and engages the advancement cam 9.4.

The cutting unit body 13.6 exemplarily further includes a pair of distal bushings 13.7 and a pair of proximal bushings 13.8. The two bushings of each pair of bushings 13.7 respectively 13.8 are exemplarily arranged aligned with respect to each other along the tool axis A and radially spaced apart from each other symmetrically to the tool axis A. The pair of proximal bushings 13.8 is further arranged proximal from the pair of distal bushings 13.7 along the tool axis A. The bushings 13.7 and 13.8 have parallel longitudinal axes.

Exemplarily two pairs of guiding pins, namely a pair of distal guiding pins 15 and a pair of proximal guiding pins 16 are attached to or part of the central rotor 8. When rotating the central rotor 8 around the tool axis A, the guiding pins 15, 16 accordingly rotate together with the central rotor 8. The guiding pins 15, 16 are further arranged for a sliding engagement of each of the distal guiding pins 15 with a corresponding distal bushing 13.7 and simultaneously each of the proximal guiding pins 16 with a corresponding proximal bushing 13.8. In this way, a rotation of the central rotor 8 is transmitted to the cutting unit 13 via the guiding pins 15, 16 and the bushings 13.7, 13.8, such that the cutting unit 13 is rotationally coupled to the central rotor 8 and rotates together with the central rotor 8 around the tool axis A. Via the sliding engagement of the guiding pins 15, 16 respectively bushings 13.7, 13.8, the cutting unit 13 is radially displaceable with respect to the central rotor 8 and the tool axis A.

Exemplarily two biasing members 17 are provided and exemplarily arranged around the proximal guiding pins 16. The biasing members are exemplarily realized as coil springs, particularly compression springs. An inner end of each of the coils springs 17 is supported by the central rotor 8, while an outer end of the coil spring engages the cutting unit body 13.6, resulting in the coil springs 17 being clamped and compressed between the cutting unit 13, respectively. The coil springs 17 radially bias the cutting unit 13 outwards, thereby ensuring proper engagement and contact between the advancement tracking member 13.5 and the advancement cam 9.4.

The stripping tool 1 further includes a back-pusher 14. The back-pusher 14 exemplarily includes a back-pusher plate 14.1 with a pair of back-pusher bushings 14.2 that are arranged for sliding engagement with the distal guiding pins 15. Thereby, the back-pusher 14 rotates with the with central rotor 8 around the tool axis 8 in the same way as the cutting unit 13. Furthermore, the back-pusher 14 is radially displaceable with respect to the tool axis A and the central rotor 8. The back-pusher 14 is arranged radially opposite to the cutting unit 13, such that a cable to be stripped is seated between the cutting unit 13 and the back-pusher 14.

The back-pusher 14 further includes a back-pusher tracking member 14.3 that is exemplarily designed as ball bearing in the same way as the advancement tracking member 13.5 and rotatable around an axis parallel to the tool axis A. The back-pusher tracking member 14.3 is axially aligned with and engages the back-pushing cam 9.5

The cooperation and interaction of the cutting unit 13, the back-pusher 14, the advancement cam 9.4, and the back-pushing cam 9.5 is best visible from FIG. 12. In combination with the sectional cuts of FIG. 7 and FIG. 8 as discussed further below. Where the advancement tracking member 13.5 engages the advancement cam 9.4, the radial position of the cutting unit 13 is defined by the radial distance of the contact point between the advancement cam 9.4 respectively the advancement tracking member 13.5 to the tool axis A (It is noted that in FIG. 12 the advancement cam 9.4 is not visible because it is on the inner surface of the control rotor 9). In this stage, the advancement tracking member is radially biased against the advancement cam 9.4, with the length and compression of the coil springs 17 varying with the radial position of the cutting unit 13 (see FIG. 7). When operating the cutting tool by rotating the central rotor and the control rotor 9 with somewhat different rotational speed as explained before, the cutting unit 13 is accordingly controlled by the advancement cam 9.4 to move from the retracted radial position to an advanced radial position, thereby cutting the sheath 101, the outer conductor 102 and the dielectric of the cable to be stripped. The end section of the cable is arranged inside the cable receiving space 8.3 which serves as abutment for the cutting force. In the advanced radial position, the cutting is finished.

When further proceeding the rotation of the central rotor 8 (with the cutting unit 13) and accordingly the relative rotational movement between the central rotor 8 and the control rotor 9, the cutting unit is radially retracted in outwards direction and back into the initial retracted position by the back-pusher 14. The advancement cam 9.4, is designed such that contact between the advancement cam 9.4 and the advancement tracking member 13.5 is lost. instead, the back-pusher tracking member 14.3 comes into engagement with the back-pushing cam 9.5 (see FIG. 8). Via this contact, the back-pusher 14 is, upon the movement being continued, displaced radially towards the tool axis A. At some point, back-pushing projections 13.9 that extend from or are formed integrally with the cutting unit body 13.6 parallel to the guiding pins 15, 16 come into contact engagement with opposing back-pushing surface 14.4 of the back-pusher plate 14.1. As the movement proceeds, this contact of the back-pusher plate 14.1 and the back-pushing projections 13.9 results in the cutting unit 13 being radially pushed back into the retracted initial position (shown in FIG. 12). With an exemplary design, this whole process is carried out during 16 revolutions of the central rotor Sand the cutting unit 13 around the tool axis A.

In the initial retracted position, cutting unit 13 is radially blocked against further outwards movement by block members (not shown) The block members are exemplarily realized by two screws that are screwed into the front surfaces of the distal guiding pins 15. In the retracted initial position of the cutting unit 13, the screw heads, having a larger diameter than the distal guiding pins 15, contact the cutting unit body 13.6, thereby preventing further radial outwards movement of the cutting unit 13.

The control rotor 9 of this embodiment has an optional control rotor cut-out 9.6 that is aligned with the cutting unit 13 in the initial retracted position. After axial removal of the portion 3.2 of the second housing part 3 the snap elements 8.5 of the central rotor 8 and the counter surface 3.7 of the portion 3.1 of the second housing part 3 may be disengaged and the portion 3.1 of the second housing part 3 may be axially separated from the central rotor 8. After removal of the screws that serve as block members as described before, the cutting unit 13 may be radially removed from the other components of the stripping tool 1 as shown in FIG. 12 via the control-rotor cut-out 9.6.

Figure 5:
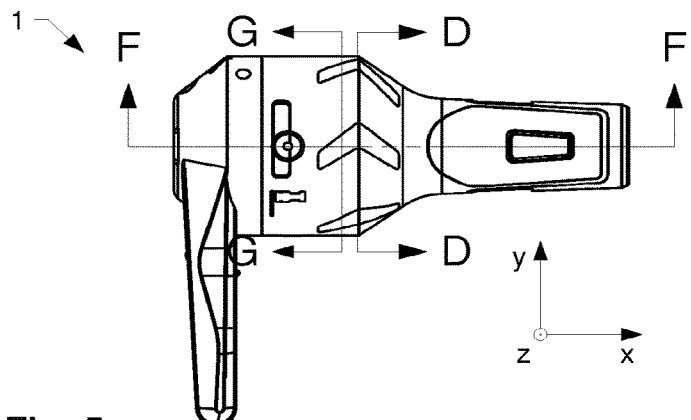
FIG. 5 shows a stripping tool in a schematic side view with indication of sectional planes.
Figure 6:
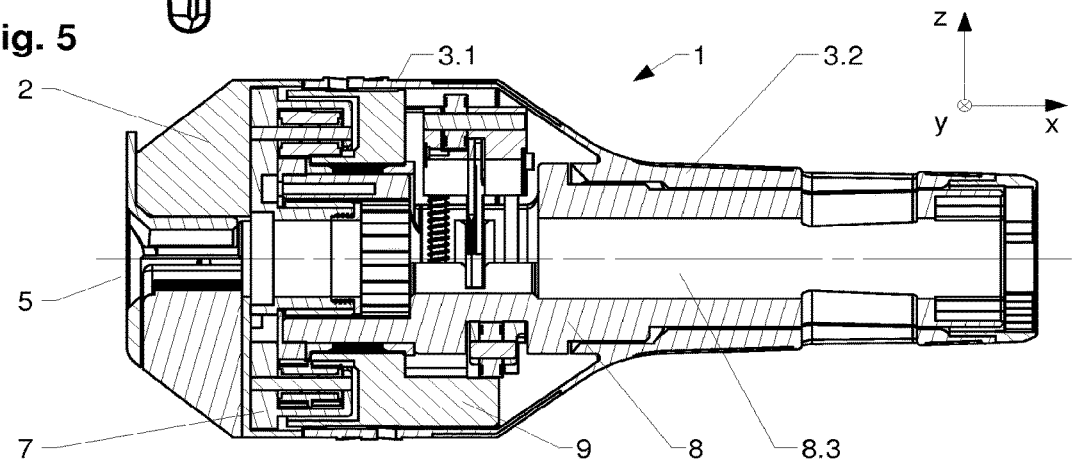
FIG. 6 shows a cut of the stripping tool according FIG. 5 along a first cutting plane.

Reference is further made FIG. 5, FIG. 6, FIG. 7, and FIG. 8. FIG. 5 shows a side view of the stripping tool 1 together with the indication of sectional planes F-F, D-D, and G-G. FIG. 6 shows the sectional view F-F, FIG. 7 the sectional view G-G, and FIG. 8 the sectional view D-D. The sectional plane G-G cuts the advancement cam 9.4 and the sectional plane D-D cuts the pushing-back cam 9.5

In the following, reference is additionally made to FIG. 10*a* and FIG. 10*b*, showing further embodiments of a stripping tool 1 in a perspective view. With exception to the differences as discussed in the following, these embodiments may be designed in the same way as the before-discussed embodiment.

In the embodiment of FIG. 10*a*, the handle 4A is formed by a single tubular element that is shaped to be held by a hand of a user. In the embodiment of FIG. 10*b*, no handle is present. Instead, a user may hold the first housing part 2 in one hand and grasp the second housing part 3 with the other hand for rotating the second housing part 3 against the first housing part.

In both of the embodiments FIG. 10*a* and FIG. 10*b*, the clamping structure for clamping the cable with respect to the first housing part 2 may be omitted. Instead the user may grasp the cable with the same hand as the first housing part 2 or the cable may with some of it length be already installed in a cable channel or the like and thereby secured against rotation.

REFERENCE SIGNS 1 stripping tool
2 first housing part
2*a* recess
3, 3.1, 3.2 second housing part
3.3 indication arrows
3.4 external drive coupler
3.5 window
3.6 anti-rotation contour
3.7 surface
4 handle
5 cable receiving opening
6 progress indicator
6.1 progress indicator window
6.2 pointer
7 stator
8 central rotor
8.1 outer bearing surface
8.2 Proximal outer contour
8.3 cable receiving space
8.4 anti-rotation contour
8.5 snap element
9 control rotor
9.1 circumferential recess
9.2 second stage output toothed wheel
9.3 inner bearing surface
9.4 advancement cam
9.5 back-pushing cam
9.6 control rotor cut-out
10 chamfering blade
11 first stage input toothed wheel
11.1 distal inner contour
12 Intermediate gear pair
12.1 first stage output toothed wheel
12.2 second stage input toothed wheel
12.3 intermediate gear axis
13 cutting unit
13.1 sheath blade
13.2 outer conductor blade
13.3 dielectric blade
13.4 locking member
13.4*a*, 13.4*b* prawn
13.5 advancement tracking member; ball bearing
13.6 cutting unit body
13.7 distal bushings
13.8 proximal bushings
13.9 back-pushing projections
14 back-pusher
14.1 back-pusher plate
14.2 back-pusher bushings
14.3 back-pusher tracking member; ball bearing
14.4 back-pushing surface
15 distal guiding pins
16 proximal guiding pins
17 biasing member; coil spring 100 corrugated cable
101 sheath
102 outer conductor
103 dielectric
103a rib
104 inner conductor
A tool axis

What is claimed is:

1. A stripping tool for a cable, the stripping tool comprising:
   a cutting unit with a plurality of blades;
   a cable seat for supporting the cable with respect to a cutting force; and
   a kinematic structure that couples the cutting unit to the cable seat, wherein the kinematic structure is operatively coupled with the cutting unit to move the plurality of blades in a radial movement with respect to, and rotationally around, a tool axis and the cable, the cable being received by the cable seat,
   wherein the stripping tool includes a linear guide, the linear guide being operatively coupled to the plurality of blades to guide the radial movement of the plurality of blades,
   wherein the cutting unit defines an opening through which the cable passes,
   wherein the kinematic structure comprises a cam structure, the cam structure controlling the radial movement of the plurality of blades,
   wherein the cam structure and the cutting unit are operatively coupled such that the plurality of blades and the cam structure move around the tool axis and the cable with different rotational speeds, and
   wherein the plurality of blades are fixed with respect to one another.

2. The stripping tool according to claim 1, wherein the linear guide includes a guiding pin and a bushing.

3. The stripping tool according to claim 1, wherein the plurality of blades includes a sheath blade, an outer conductor blade, and a dielectric blade in defined geometric relation relative to each other.

4. The stripping tool according to claim 1,
   wherein the stripping tool further comprises one or more prongs operatively coupled to the cutting unit for axially locking the cable with respect to the plurality of blades, wherein the one or more prongs are operatively coupled with the kinematic structure to move the one or more prongs radially to the tool axis.

5. The stripping tool according to claim 4, wherein the one or more prongs are configured to engage a circumferential recess in a cable sheath.

6. The stripping tool according to claim 4, wherein the one or more prongs are coupled to the plurality of blades to move together with the plurality of blades.

7. The stripping tool according to claim 1, wherein the cam structure is arranged around the cutting unit.

8. The stripping tool according to claim 7, wherein the stripping tool comprises a coupling gear, the coupling gear operatively coupling the cutting unit and the cam structure.

9. The stripping tool according to claim 8, wherein the coupling gear comprises a toothed wheel gear.

10. The stripping tool according to claim 1, wherein the kinematic structure comprises a drive coupler, wherein the drive coupler is configured to receive a driving force or a driving torque, the driving force or the driving torque moving the plurality of blades.

11. The stripping tool according to claim 10, wherein the drive coupler is arranged to rotate around the tool axis.

12. The stripping tool according to claim 11, wherein the drive coupler and the plurality of blades are operatively coupled to move around the tool axis at a same rotational speed.

13. The stripping tool according to claim 1, wherein the cutting unit is arranged removable from the kinematic structure.

14. The stripping tool according to claim 13, wherein the cutting unit is arranged removable from a cutting tool housing.

15. A method for stripping an end section of a cable, the method comprising moving a plurality of blades of a cutting unit radially to, in a radial movement, and rotationally around, in a rotational movement, the end section of the cable and a tool axis, wherein the radial movement is a feed movement and the rotational movement is a cutting movement, the method further comprising controlling and coordinating the radial movement and the rotational movement via a kinematic structure, the kinematic structure coupling the cutting unit to a cable seat, the cable seat receiving the cable, and the method further comprising supporting the cable with respect to a cutting force,
   wherein a linear guide is operatively coupled to the plurality of blades to guide the radial movement of the plurality of blades,
   wherein the kinematic structure comprises a cam structure, the cam structure controlling the radial movement of the plurality of blades,
   wherein the cutting unit defines an opening through which the cable passes,
   wherein the cam structure and the cutting unit are operatively coupled such that the plurality of blades and the cam structure move around the tool axis and the cable with different rotational speeds, and
   wherein the plurality of blades are fixed with respect to one another.

16. The method according to claim 15, wherein the cable is a coaxial cable, and the method comprises cutting a sheath, an outer conductor and a dielectric of the cable with the plurality of blades, the plurality of blades including a sheath blade, an outer conductor blade and a dielectric blade, respectively, the method further comprising controlling and coordinating movement of the sheath blade, the outer conductor blade and the dielectric blade relative to the end section of the cable via the kinematic structure.

17. The method according to claim 16, wherein the coaxial cable is a corrugated cable.

18. The method according to claim 15, wherein the method further comprises:
   axially locking the cable with respect to the plurality of blades via one or more prongs engaging a circumferential recess of a cable sheath.

19. The method according to claim 15, wherein the linear guide includes a guiding pin and a bushing.

* * * * *